United States Patent
Chen et al.

(10) Patent No.: US 12,465,791 B2
(45) Date of Patent: Nov. 11, 2025

(54) ORAL CARE COMPOSITION

(71) Applicant: Colgate-Palmolive Company, New York, NY (US)

(72) Inventors: Dandan Chen, Bridgewater, NJ (US); Harsh Mahendra Trivedi, Hillsborough, NJ (US); Peter R. Hilliard, Jr., Far Hills, NJ (US); James Masters, Ringoes, NJ (US)

(73) Assignee: Colgate-Palmolive Company, New York, NY (US)

( * ) Notice: Subject to any disclaimer, the term of this patent is extended or adjusted under 35 U.S.C. 154(b) by 553 days.

(21) Appl. No.: 17/707,822

(22) Filed: Mar. 29, 2022

(65) Prior Publication Data

US 2022/0219020 A1    Jul. 14, 2022

Related U.S. Application Data

(62) Division of application No. 15/533,697, filed as application No. PCT/US2015/066318 on Dec. 17, 2015, now abandoned.

(60) Provisional application No. 62/096,503, filed on Dec. 23, 2014.

(51) Int. Cl.
| | |
|---|---|
| A61Q 11/00 | (2006.01) |
| A61K 8/21 | (2006.01) |
| A61K 8/24 | (2006.01) |
| A61K 8/44 | (2006.01) |

(52) U.S. Cl.
CPC .............. *A61Q 11/00* (2013.01); *A61K 8/21* (2013.01); *A61K 8/24* (2013.01); *A61K 8/44* (2013.01)

(58) Field of Classification Search
CPC ...................................................... A61Q 11/00
USPC ......................................................... 424/49
See application file for complete search history.

(56) References Cited

U.S. PATENT DOCUMENTS

| | | | |
|---|---|---|---|
| 3,935,305 A * | 1/1976 | Delaney ................. | A61Q 11/00 424/49 |
| 8,501,161 B2 | 8/2013 | Prencipe et al. | |
| 9,561,168 B2 | 2/2017 | Schaeffer-Korbvlo et al. | |
| 9,717,929 B2 | 8/2017 | Chopra et al. | |
| 2007/0140990 A1 | 6/2007 | Fetissova et al. | |
| 2008/0220140 A1 | 9/2008 | Ley et al. | |
| 2011/0059029 A1 | 3/2011 | Kohli et al. | |
| 2013/0005646 A1 | 1/2013 | Schaeffer et al. | |
| 2013/0224270 A1 | 8/2013 | Robinson et al. | |
| 2014/0305461 A1 | 10/2014 | Pimenta et al. | |
| 2015/0305993 A1 | 10/2015 | Rege et al. | |
| 2017/0136074 A1 * | 5/2017 | Fagerberg .............. | A61Q 11/00 |

FOREIGN PATENT DOCUMENTS

| | | | |
|---|---|---|---|
| EP | 2384740 | 5/2016 | |
| RU | 2527691 | 9/2014 | |
| WO | WO-2005000253 A1 * | 1/2005 | ............. A61Q 11/00 |
| WO | 2007/076446 | 7/2007 | |
| WO | 2009/100263 | 8/2009 | |
| WO | 2009/100268 | 8/2009 | |
| WO | 2012/057739 | 5/2012 | |
| WO | WO2012/064338 * | 5/2012 | ............... A61K 8/34 |
| WO | 2012/078337 | 6/2012 | |
| WO | 2013/089734 | 6/2013 | |
| WO | 2013/089735 | 6/2013 | |
| WO | 2014/088535 | 6/2014 | |
| WO | 2014/088573 | 6/2014 | |

OTHER PUBLICATIONS

Arrigo et al., 2007, "Hsp27 (HspB1) and alpha B-crystallin (HspB5) as therapeutic targets," FEBS Letters 581(19):3665-3674.
Debats et al., 2009, "Role of arginine in superficial wound healing in man," Nitric Oxide: Biology and Chemistry 21(3-4):175-183.
Hiroshi et al. (Modulation of Heat Shock Protein 27 (Hsp27) Anti-apoptotic Activity by Methylglyoxal Modification, Journal of Biological Chemistry, vol. 277, No. 48). (Year: 2002).
International Search Report and Written Opinion of the International Searching Authority in International Application No. PCT/US2015/066318, mailed Apr. 25, 2016.
RU2527691, Nikolaevich, et al., "Tooth Paste Containing Buffer Mixture," Sep. 10, 2014, English language machine translation of abstract, Espacenet, date obtained: Sep. 26, 2019, 1 page https://worldwide.espacenet.com/publicationDetails/biblio?7,C=RU&NR=2527691C1&KC=C1&FT=D&ND=3&date=2014091080B=&locale=en_EP.
Tashiro et al. (Arginine induced acute pancreatitis alters the actin cytoskeleton and increases heat shock protein expression in rat pancreatic acinar cells, Gut, vol. 49, pp. 241-250). (Year: 2001).

* cited by examiner

*Primary Examiner* — Walter E Webb

(57) ABSTRACT

Provided herein is an oral care composition comprising a basic amino acid or a salt thereof in an amount of from 0.001 weight % to 0.08 weight % by total weight of the composition, and an orally acceptable carrier. The composition is effective in accelerating HSP 27 production in damaged tissues of the oral cavity and enhances repair of the damaged tissue.

12 Claims, No Drawings

ORAL CARE COMPOSITION

CROSS REFERENCE TO RELATED APPLICATIONS

This application is a divisional of U.S. application Ser. No. 15/533,697, filed Jun. 7, 2017 which is a United States Application under 35 U.S.C. § 371 of PCT Application No. PCT/US2015/066318, filed Dec. 17, 2015, which claims the benefit of U.S. provisional application 62/096,503, filed Dec. 23, 2014, the entire contents of each of which are incorporated herein by reference in their entirety.

BACKGROUND

Soft tissues of the oral cavity (for example, oral mucous membranes, gingival tissue and tongue) are susceptible to physical, physiochemical and biological injury. Soft tissue damage in the oral cavity is often very painful and may even compromise a person's ability to chew and swallow. There are a number of causes of soft tissue injury in the oral cavity, including poor-fitting braces and dentures, infection from microorganisms, physical trauma from biting or from sharp food, burns and allergies.

Various mediators and biological pathways are known to be involved in the maintenance of healthy tissue and in damage repair. Heat Shock Proteins (HSPs) in particular, are involved in multiple chaperoning and housekeeping functions, and aid in the folding or re-folding of denatured proteins that may arise from increased temperatures, tissue damage or stress. HSPs are found in most cells and tissues, and in extracellular and interstitial fluids such as blood and saliva. Extracellular HSPs have been reported to play important roles in tooth surface defense, mucosal defense, cytoprotection and inflammation. A number of HSPs, with different molecular weights, have been identified. These include HSP 27 kD, HSP 47 kD, HSP 56 kD, HSP 60 kD and HSP 70 kD. Of particular interest is HSP 27 which plays an important role in determining normal skin structure and function, modulates activation of the Nf-kB pathway, controls cell growth, and controls the stress response. HSP-27 has additionally been shown to reduce inflammation and reduce reactive oxygen species (Arrigo et al., 2007, FEBS Letters 581, p 3665-3674).

There is a need to provide compositions which effectively prevent oral soft tissue damage and/or promote healing of soft tissue wounds in the oral cavity. Given their role in maintenance of healthy tissue, inflammation and damage repair, HSPs would be useful molecular targets for preventing tissue damage and for promoting the healing of soft tissue.

BRIEF SUMMARY

The present inventors have demonstrated that HSP 27 expression is gradually increased when soft tissue in the oral cavity is damaged. The present inventors have unexpectedly found that on exposure of damaged soft tissue to very low concentrations of a basic amino acid such as arginine, there is a significantly accelerated expression of HSP 27. Thus, small amounts of arginine may be used to hasten wound healing and repair damage of soft tissue in the oral cavity.

Accordingly, in a first aspect, there is provided an oral care composition comprising a basic amino acid or a salt thereof in an amount of from 0.001 weight % to 0.08 weight % by total weight of the composition, and an orally acceptable carrier.

Preferably, the basic amino acid or salt thereof is present in the composition in an amount of from 0.003 weight % to 0.05 weight % by total weight of the composition. More preferably, the basic amino acid or salt thereof is present in the composition in an amount of from 0.005 weight % to 0.02 weight % by total weight of the composition. Most preferably, the basic amino acid or salt thereof is present in the composition in an amount of about 0.005 weight % by total weight of the composition.

Optionally, the basic amino acid is selected from arginine, lysine, and histidine. Preferably, the basic amino acid is arginine.

Optionally, the composition is selected from mouthwashes, sprays, dentifrices, oral strips, chewing gums and lozenges.

Optionally, the oral care composition further comprises one or more agents selected from: surfactants, desensitizing agents, whitening agents, tartar control agents, binders, thickening agents, detergents, adhesion agents, foam modulators, pH modifying agents, mouth feel agents, sweeteners, flavorants, colorants, humectants, fluoride sources and combinations thereof.

Optionally, the composition comprises free basic amino acid and is substantially free of any salts of the basic amino acid.

In a second aspect, there is provided an oral care composition comprising a basic amino acid or a salt thereof in an amount of from 0.001 weight % to 0.08 weight % by total weight of the composition, and an orally acceptable carrier, for use in preventing or repairing soft tissue damage in an oral cavity. The composition is preferably as defined herein.

Optionally, the prevention or repair of soft tissue damage comprises increasing or accelerating HSP 27 expression in the tissue. Further optionally, the tissue is gingival tissue.

In a third aspect, there is provided an oral care composition comprising a basic amino acid or a salt thereof in an amount of from 0.001 weight % to 0.08 weight % by total weight of the composition, and an orally acceptable carrier, for use in healing a wound in an oral cavity. The composition is preferably as defined herein.

Optionally, the use comprises increasing or accelerating HSP 27 expression in a tissue containing the wound. Further optionally, the wound is in gingival tissue.

In a fourth aspect, there is provided an oral care composition comprising a basic amino acid or a salt thereof in an amount of from 0.001 weight % to 0.08 weight % by total weight of the composition, and an orally acceptable carrier, for use in preventing or treating inflammation in a tissue of an oral cavity.

Optionally, the use comprises increasing or accelerating HSP 27 expression in a tissue containing the wound. Further optionally, the tissue is in gingival tissue.

In a fifth aspect, there is provided an oral care composition comprising a basic amino acid or a salt thereof in an amount of from 0.001 weight % to 0.08 weight % by total weight of the composition, and an orally acceptable carrier, for use in reducing reactive oxygen species in a tissue of an oral cavity.

Optionally, the use comprises increasing or accelerating HSP 27 expression in a tissue containing the wound. Further optionally, the tissue is in gingival tissue.

Optionally, the uses described herein comprise contacting the oral cavity with the composition for a period of at least 30 seconds, at least 1 minute, at least 5 minutes, at least 10 minutes, at least 15 minutes or at least 1 hour.

In a sixth aspect, there is provided a method of increasing or accelerating HSP 27 in a soft tissue of an oral cavity comprising administering to the tissue a composition comprising a basic amino acid or a salt thereof in an amount of from 0.001 weight % to 0.08 weight % by total weight of the composition, and an orally acceptable carrier.

Optionally, the method comprises one or more of: preventing or repairing soft tissue damage in the oral cavity, healing a wound in the tissue of the oral cavity, preventing or treating inflammation in the tissue of the oral cavity and reducing reactive oxygen species in the tissue of the oral cavity. Further optionally, the tissue is gingival tissue. Still further optionally, the method comprises contacting the oral cavity with the composition for a period of at least 30 seconds, at least 1 minute, at least 5 minutes, at least 10 minutes, at least 15 minutes or at least 1 hour.

In a seventh aspect, there is provided a method of increasing or accelerating HSP 27 in a tissue of an oral cavity comprising administering to the tissue an effective amount of a basic amino acid or a salt thereof.

Optionally, the effective amount of the basic amino acid or a salt thereof is from 10 to 10,000 ppm. Further optionally the effective amount of the basic amino acid or a salt thereof is from 10 to 1000 ppm. Further optionally the effective amount of the basic amino acid or a salt thereof is from 10 to 500 ppm. Further optionally the effective amount of the basic amino acid or a salt thereof is from 10 to 200 ppm. Further optionally the effective amount of the basic amino acid or a salt thereof is from 10 to 100 ppm. Further optionally the effective amount of the basic amino acid or a salt thereof is from 10 to 50 ppm or 50 ppm to 100 ppm. Optionally, the basic amino acid or a salt thereof is arginine.

In an eighth aspect, there is provided a use of an oral care composition comprising a basic amino acid or a salt thereof in an amount of from 0.001 weight % to 0.08 weight % by total weight of the composition, and an orally acceptable carrier, in the manufacture of a medicament for one or more of the following: preventing or repairing soft tissue damage in an oral cavity, healing a wound in an oral cavity, preventing or treating inflammation in an oral cavity, and reducing reactive oxygen species in a tissue of an oral cavity. The composition may be as defined herein. Preferably, the prevention or repair of soft tissue damage, healing of the wound, the prevention or reduction of inflammation, and/or the reduction of reactive oxygen species comprises increasing or accelerating HSP-27 production in the tissue.

Optionally, the tissue is gingival tissue. Further optionally, the medicament is to be brought into contact with the oral cavity for a period of at least 30 seconds, at least 1 minute, at least 5 minutes, at least 10 minutes, at least 15 minutes or at least 1 hour.

In particular embodiments, the present disclosure provides:

1.1 An oral care composition comprising a basic amino acid or a salt thereof in an amount of from 0.001 weight % to 0.08 weight % by total weight of the composition, and an orally acceptable carrier.

1.2 Composition 1.1, wherein the basic amino acid or salt thereof is present in the composition in an amount of from 0.003 weight % to 0.05 weight % by total weight of the composition.

1.3 Composition 1.2, wherein the basic amino acid or salt thereof is present in the composition in an amount of from 0.005 weight % to 0.02% weight % by total weight of the composition.

1.4 Composition 1.3, wherein the basic amino acid or salt thereof is present in the composition in an amount of 0.005 weight % by total weight of the composition.

1.5 Any preceding Composition, wherein the basic amino acid is selected from arginine, lysine, and histidine.

1.6 Composition 5, wherein the basic amino acid is arginine.

1.7 Any preceding Composition, wherein the composition is selected from mouthwashes, sprays, dentifrices, oral strips, chewing gums and lozenges.

1.8 Any preceding Composition, wherein the oral care composition further comprises one or more agents selected from: surfactants, desensitizing agents, whitening agents, tartar control agents, binders, thickening agents, detergents, adhesion agents, foam modulators, pH modifying agents, mouth feel agents, sweeteners, flavorants, colorants, humectants, fluoride sources and combinations thereof.

1.9 Any preceding Composition, wherein the composition comprises the basic amino acid in a free form and is substantially free of any salts of the basic amino acid.

1.10 Any preceding Composition, for use in preventing or repairing soft tissue damage in an oral cavity.

1.11 Any of Compositions 1.1 to 1.9, for use in healing a wound in a tissue of an oral cavity.

1.12 Any of Compositions 1.1 to 1.9, for use in preventing or treating inflammation in a tissue of an oral cavity.

1.13 Any of Compositions 1.1 to 1.9, for use in reducing reactive oxygen species in a tissue of an oral cavity.

1.14 The composition for use of 1.10-1.13, wherein the use comprises increasing or accelerating HSP 27 expression in the tissue.

1.15 The composition for use of 1.10 to 1.14, wherein the tissue is gingival tissue.

1.16 The composition for use of 1.10 to 1.15, wherein the use comprises contacting the oral cavity with the composition for a period of at least 30 seconds, at least 1 minute, at least 5 minutes, at least 10 minutes, at least 15 minutes or at least 1 hour.

1.17 A method of increasing or accelerating HSP 27 in a tissue of an oral cavity comprising administering to the tissue any of Compositions 1.1 to 1.9.

1.18 Method 1.17, wherein the method comprises preventing or repairing soft tissue damage in the oral cavity.

1.19 Method 1.17 or 1.18, wherein the method comprises healing a wound in the tissue of the oral cavity.

1.20 Any of Methods 1.17 to 1.19, wherein the method comprises preventing or treating inflammation in the tissue of the oral cavity.

1.21 Any of Methods 1.17 to 1.20, wherein the method comprises reducing reactive oxygen species in the tissue of the oral cavity.

1.22 Any of Methods 1.17 to 1.21, wherein the tissue is gingival tissue.

1.23 Any of Methods 1.17 to 1.22 comprising contacting the oral cavity with the composition for a period of at least 30 seconds, at least 1 minute, at least 5 minutes, at least 10 minutes, at least 15 minutes or at least 1 hour.

1.24 Use of any of Compositions 1.1 to 1.9 in the manufacture of a medicament for preventing or repairing soft tissue damage in an oral cavity.

1.25 Use of any of Compositions 1.1 to 1.9 in the manufacture of a medicament for healing a wound in a tissue of an oral cavity.

1.26 Use of any of Compositions 1.1 to 1.9 in the manufacture of a medicament for preventing or treating inflammation in a tissue of an oral cavity.

1.27 Use of any of Compositions 1.1 to 1.9 in the manufacture of a medicament for reducing reactive oxygen species in a tissue of an oral cavity.

1.28 Use 1.24 to 1.27, wherein the tissue is gingival tissue.

1.29 Use 1.24 to 1.28, wherein the medicament is for increasing or accelerating HSP-27 production in the tissue.

1.30 Use 1.24 to 1.29, wherein the medicament is to be brought into contact with the oral cavity for a period of at least 30 seconds, at least 1 minute, at least 5 minutes, at least 10 minutes, at least 15 minutes or at least 1 hour.

1.31 A method of increasing or accelerating HSP 27 in a tissue of an oral cavity comprising administering to the tissue an effective amount of a basic amino acid or a salt thereof.

1.32 Method 1.31, wherein the basic amino acid or a salt thereof is arginine.

1.33 Method 1.31 or 1.32, wherein the effective amount of the basic amino acid or a salt thereof is from 10 to 1000 ppm.

1.34 Any of Methods 1.31 to 1.33 wherein the effective amount of the basic amino acid or a salt thereof is from 10 to 500 ppm.

1.35 Any of Methods 1.31 to 1.34, wherein the effective amount of the basic amino acid or a salt thereof is from 10 to 100 ppm.

1.36 Any of Methods 1.31 to 1.35 wherein the effective amount of the basic amino acid or a salt thereof is from 10 to 50 ppm.

1.37 Any of Methods 1.31 to 1.36, wherein the method comprises preventing or repairing soft tissue damage in the oral cavity.

1.38 Any of Methods 1.31 to 1.37, wherein the method comprises healing a wound in the tissue of the oral cavity.

1.39 Any of Methods 1.31 to 1.38, wherein the method comprises preventing or treating inflammation in the tissue of the oral cavity.

1.40 Any of Methods 1.31 to 1.39, wherein the method comprises reducing reactive oxygen species in the tissue of the oral cavity.

1.41 Any of Methods 1.31 to 1.40, wherein the tissue is gingival tissue.

DETAILED DESCRIPTION

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

In one arrangement, provided herein is an oral care composition comprising a basic amino in an amount of from 0.001 weight % to 0.08 weight % by total weight of the composition, and an orally acceptable carrier.

The basic amino acids which can be used in the compositions of the present the invention include not only naturally occurring basic amino acids, such as arginine (2-amino-5-guanidinopentanoic acid), lysine (2,6-diaminohexanoic acid), and histidine (2-amino-3-(1H-imidazol-4-yl)propanoic acid), but also any basic amino acids having a carboxyl group and an amino group in the molecule which are water-soluble and provide an aqueous solution with a pH of about 7 or greater. Accordingly, basic amino acids include, but are not limited to, arginine, lysine, citrullene, ornithine, creatine, histidine, diaminobutanoic acid, diaminopropionic acid, and salts thereof or combinations thereof. In a particular embodiment, the basic amino acids are selected from arginine, lysine and histidine. Preferably, the basic amino acid is arginine, for example, L-arginine.

In preferred embodiments the composition comprises the free basic amino acid. However, it is to be understood that derivatives of the basic amino acid may also be employed in the practice of the invention. For example, the basic amino acid may be utilized in the form of a salt or an ester. The basic amino acid may also be provided in the form of various conjugates. A number of such conjugates will be apparent to those skilled in the art. In a preferred embodiment, the basic amino acid is incorporated into the oral care compositions in its free form, and the composition is substantially free of salts or any other derivatives such as esters, complexes and conjugates of the basic amino acid. By "substantially free" it is meant that the composition comprises salts of the basic amino acid in an amount of less than 0.0005 weight % by total weight of the composition.

The compositions of the invention are for use in the oral cavity. Thus, salts or derivatives for use in the present invention should be safe for such use in the amounts and concentrations provided. Suitable salts include salts known in the art to be pharmaceutically acceptable salts are generally considered to be physiologically acceptable in the amounts and concentrations provided herein. Physiologically acceptable salts include those derived from pharmaceutically acceptable inorganic or organic acids or bases. These include, for example, acid addition salts such as a hydrochloride or bromide salt, and base addition such as those derived from alkali metals such as potassium and sodium, or alkaline earth metals such as calcium and magnesium. A preferred salt is a bicarbonate (for example, arginine bicarbonate).

In preferred embodiments the composition comprises the amino acid arginine. Arginine is commercially available from a number of sources (for example, Ajinomoto). In a preferred embodiment, arginine is incorporated into the oral care compositions in its free (acid) form, and the composition is substantially free of arginine salts or any other arginine derivatives such as esters, complexes and conjugates of arginine. By "substantially free" it is meant that the composition comprises arginine salts in an amount of less than 0.0005 weight % by total weight of the composition. The present inventors have found that free arginine is itself is effective in accelerating HSP 27 production in damaged gingival tissue.

In some embodiments, the composition comprises a basic amino acid (for example, arginine) or a salt thereof in an amount from 0.001 weight % to 0.08 weight %, or to 0.07 weight %, or to 0.06 weight %, or to 0.05 weight %, or to 0.04 weight %, or to 0.03 weight %, or to 0.02 weight %, or to 0.01 weight %, or to 0.009 weight %, or to 0.008 weight %, or to 0.007 weight %, or to 0.006 weight %, or to 0.005 weight %, by total weight of the composition. In other embodiments, the composition comprises a basic amino acid or a salt thereof in an amount from 0.002 weight % to 0.08 weight %, or to 0.07 weight %, or to 0.06 weight %, or to 0.05 weight %, or to 0.04 weight %, or to 0.03 weight %, or to 0.02 weight %, or to 0.01 weight %, or to 0.009 weight %, or to 0.008 weight %, or to 0.007 weight %, or to 0.006 weight %, or to 0.005 weight %, by total weight of the composition. In further embodiments, the composition comprises a basic amino acid or a salt thereof in an amount from 0.003 weight % to 0.08 weight %, or to 0.07 weight %, or to 0.06 weight %, or to 0.05 weight %, or to 0.04 weight %, or to 0.03 weight %, or to 0.02 weight %, or to 0.01 weight %, or to 0.009 weight %, or to 0.008 weight %, or to 0.007 weight %, or to 0.006 weight %, or to 0.005 weight %, by total weight of the composition. In yet further embodiments, the composition comprises a basic amino acid or a salt thereof in an amount from 0.004 weight % to 0.08 weight %, or to 0.07 weight %, or to 0.06 weight %, or to 0.05 weight %, or to 0.04 weight %, or to 0.03 weight %, or to 0.02 weight %, or to 0.01 weight %, or to 0.009 weight %, or to 0.008 weight %, or to 0.007 weight %, or to 0.006 weight %, or to 0.005 weight %, by total weight of the composition. In still further embodiments, the composition comprises a basic amino acid or a salt thereof in an amount from 0.005 weight % to 0.08 weight %, or to 0.07 weight %, or to 0.06 weight %, or to 0.05 weight %, or to 0.04 weight %, or to 0.03 weight %, or to 0.02 weight %, or to 0.01 weight %, or to 0.009 weight %, or to 0.008 weight %, or to 0.007 weight %, or to 0.006 weight %, by total weight of the composition. Optionally, the composition comprises a basic amino acid or a salt thereof in an amount from 0.01 weight % to 0.08 weight %, or to 0.07 weight %, or to 0.06 weight %, or to 0.05 weight %, or to 0.04 weight %, or to 0.03 weight %, or to 0.02 weight %, by total weight of the composition. Preferably, the composition comprises a basic amino acid or a salt thereof in an amount from 0.003 weight % to 0.05 weight %, or from 0.005 weight % to 0.02 weight % by total weight of the composition. More preferably, the composition comprises a basic amino acid or a salt thereof in an amount of 0.005 weight % by total weight of the composition.

The present inventors have unexpectedly found that basic amino acids such as arginine are effective in accelerating HSP 27 production in damaged gingival tissue using the low concentrations defined above, thereby hastening repair of the damaged tissue. By incorporating arginine into oral care compositions at such low concentrations, any undesirable side effects and/or toxicity effects of the amino acid are minimized.

Form of Composition

The compositions as described herein may be provided in the form of, for example, a mouthwash, a spray, a dentifrice, an oral strip, a chewing gum, a bead, a chew or a lozenge. A dentifrice includes, without limitation, a toothpaste, gel and powder. The compositions may be in the form of a semi-liquid such a gel, as well as a flowable liquid, which may be applied to an oral cavity by painting with a brush or other suitable device. "Painting" herein means application of a thin layer of the composition to surface within an oral cavity.

Carriers and Other Ingredients

The expression "orally acceptable carrier" as used herein denotes any safe and acceptable materials for oral use. Such materials include water or other solvents that may contain a humectant such as glycerin, sorbitol, xylitol and the like. In some aspects, the term "orally acceptable carrier" encompasses all of the components of the oral care composition except for the basic amino acid or the salt thereof. In other aspects, the term refers to inert or inactive ingredients that serve to deliver the basic amino acid or salt thereof, and/or any other functional ingredients, to the oral cavity.

Orally acceptable carriers for use in the invention include conventional and known carriers used in making mouthwashes or mouthrinses, toothpastes, tooth gels, tooth powder, lozenges, gums, beads, edible strips, tablets and the like. Carriers should be selected for compatibility with each other and with other ingredients of the composition.

The following non-limiting examples are provided. In a toothpaste composition, the carrier is typically a water/humectant system that provides a major fraction by weight of the composition. Alternatively, the carrier component of a toothpaste composition may comprise water, one or more humectants, and other functional components other than the basic amino acid or salt thereof. In a mouthrinse or a mouthwash formulation, the carrier is typically a water/alcohol liquid mixture in which the basic amino acid is dissolved or dispersed. In a dissolvable lozenge, the carrier typically comprises a solid matrix material that dissolves slowly in the oral cavity. In chewing gums, the carrier typically comprises a gum base, while in an edible strip, the carrier typically comprises one or more film forming polymers.

The compositions used in the methods provided herein may comprise one or more additional oral care ingredients which may have specific functions. The one or more additional oral care ingredients may optionally be selected from the group consisting of: surfactants, desensitizing agents, whitening agents, tartar control agents, binders, thickeners, detergents, adhesion agents, foam modulators, pH modifying agents, mouth feel agents, sweeteners, flavourants, colorants, preservatives, humectants, fluoride sources and combinations thereof.

Surfactants may be present in the oral care compositions provided herein to provide foaming, taste, flavour, texture and mouth feel properties to the compositions, and in particular to render the compositions more cosmetically acceptable. Suitable surfactants include, without limitation, water-soluble salts of $C_{8-2}$ alkyl sulfates, sulfonated monoglycerides of $C_{8-20}$ fatty acids, sarcosinates, taurates, sodium lauryl sulfate, sodium cocoyl monoglyceride sulfonate, sodium lauryl sarcosinate, sodium lauryl isoethionate, sodium laureth carboxylate and sodium dodecyl benzenesulfonate, and cocoamidopropyl betaine. Preferably, the surfactant comprises sodium lauryl sulfate (SLS).

The compositions provided herein optionally incorporate one or more desensitizing agents. These include, without limitation, potassium salts such as potassium nitrate, potassium bicarbonate, potassium chloride, potassium citrate, and potassium oxalate; capsaicin; eugenol; strontium salts; zinc salts; chloride salts and combinations thereof. Such agents may be added in effective amounts, e.g., from about 1 weight % to about 20 weight % by total weight of the composition, depending on the agent chosen. The compositions defined herein may also be used to treat hypersensitivity by blocking dentin tubules when applied to a tooth surface.

The compositions provided herein may optionally include a tooth whitening or tooth bleaching agent. Suitable whitening and bleaching agents include peroxides, metal chlorites, persulfates. Peroxides include hydroperoxides, hydrogen peroxide, peroxides of alkali and alkaline earth metals, organic peroxy compounds, peroxy acids, and mixtures thereof. Peroxides of alkali and alkaline earth metals include lithium peroxide, potassium peroxide, sodium peroxide, magnesium peroxide, calcium peroxide, barium peroxide, and mixtures thereof. Other peroxides include perborate, urea peroxide, and mixtures thereof. Suitable metal chlorites may include calcium chlorite, barium chlorite, magnesium chlorite, lithium chlorite, sodium chlorite, and potassium chlorite. Such agents may be incorporated in effective amounts, for example, from 1 weight % to 20 weight % by total weight of the composition, depending on the agent chosen.

The compositions provided herein may optionally include tartar control agents such as pyrophosphate salts including dialkali or tetraalkali metal pyrophosphate salts such as $Na_4P_2O_7$, $K_4P_2O_7$, $Na_2K_2P_2O_7$, $Na_2H_2P_2O_7$ and $K_2H_2P_2O_7$, sodium tripolyphosphate, long chain polyphosphates such as sodium hexametaphosphate and cyclic phosphates such as sodium trimetaphosphate.

The compositions provided herein may further comprise a binder. Any conventional binder may be utilized. Suitable binding agents include marine colloids; carboxyvinyl polymers; carrageenans; starches; cellulosic polymers such as hydroxyethylcellulose. carboxymethylcellulose (carmellose), hydroxypropyl methyl cellulose, and salts thereof (e.g., carmellose sodium); natural gums such as karaya, xanthan, gum arabic and tragacanth; chitosan; colloidal magnesium aluminum silicate; and colloidal silica. Preferably, a binder is present in the composition in an amount from 0.1 weight % to 5 weight % by total weight of the composition.

Thickening agents which may be incorporated into the compositions defined herein include natural and synthetic gums and colloids. Suitable thickening agents include naturally occurring polymers such as carrageenan, xanthan gum, polyglycols of varying molecular weights sold under the tradename Polyox, and polyvinylpyrrolidone. Compatible inorganic thickening agents include amorphous silica compounds and colloidal silica compounds available under the trade designation Cab-o-sil manufactured by Cabot Corporation. Other inorganic thickening agents include natural and synthetic clays such as hectorite clays, lithium magnesium silicate (laponite) and magnesium aluminum silicate (Veegum).

The compositions defined herein may optionally comprise one or more adhesion agents. The adhesion agent may by a polymeric adherent material. The polymeric adherent material may be any agent that attaches to the surface of a mammalian tooth and/or to a heterogeneous biofilm which also may be present on a tooth's surface. Attachment may occur by any means, such as ionic interaction, van der Waals forces, hydrophobic-hydrophilic interactions, etc. The adherent material may be, for example, any homopolymers or copolymers (hereinafter referred to collectively as a "polymers") that adhere to the surface of a tooth. Such polymers may include cellulose polymers, for example one or more hydroxyalkyl cellulose polymers, such as hydroxypropylmethyl cellulose (HPMC), hydroxyethylpropyl cellulose (HEPC), hydroxybutylmethyl cellulose (HBMC), and carboxymethyl cellulose (CMC). Preferably, the polymeric adherent material comprises at least one cellulose material, for example sodium carboxymethyl cellulose.

The polymeric adherent material may alternatively or additionally include poly (ethylene oxide) polymers (such as POLYOX from Dow Chemical), linear PVP and cross-linked PVP, PEG/PPG copolymers (such as BASF Pluracare L1220), ethylene oxide (EO)—propylene oxide (PO) block copolymers (such as polymers sold under the trade mark Pluronic available from BASF Corporation), ester gum, shellac, pressure sensitive silicone adhesives (such as BioPSA from Dow-Corning), methacrylates, or mixtures thereof. In one embodiment, a copolymer comprises (PVM/MA). Optionally, the copolymer may be selected from the group consisting of: poly (methylvinylether/maleic anhydride), or poly (methylvinylether/maleic acid), or poly (methylvinylether/maleic acid) half esters, or poly (methylvinylether/maleic acid) mixed salts.

Polymers of any molecular weight may be used, including, for example molecular weights of 50,000 to 500,000 Da, 500,000 to 2,500,000 Da or 2,500,000 to 10,000,000 Da (calculated by either number average or weight average).

The oral care compositions defined herein also may include a foam modulator. Foam modulators typically increase the amount of foam produced, for example, when the oral cavity is brushed using the composition in accordance with the methods defined herein. Illustrative examples of foam modulators that increase the amount of foam include, but are not limited to polyoxyethylene and certain polymers including alginate polymers.

The foaming agent is preferably in the oral care composition in an amount from 0.01 to about 0.9 weight %, or from 0.05 to 0.5 weight %, or from 0.1 to about 0.2 weight % by total weight of the composition.

Polyoxyethylene may increase the amount of foam and the thickness of the foam generated by the oral care carrier component of the present invention. Polyoxyethylene is also commonly known as polyethylene glycol ("PEG") or polyethylene oxide. The polyoxyethylenes suitable for this invention will have a molecular weight of from 200,000 to 7,000,000 Da, and preferably from 600,000 to 2,000,000 Da, and more preferably from 800,000 to 1,000,000 Da. Polyox® is the trade name for the high molecular weight polyoxyethylene produced by Union Carbide.

Preferably, the compositions provided herein further comprise at least one pH modifying agent. Such agents include acidifying agents to lower pH, basifying agents to raise pH, and buffering agents to control pH within a desired range. The pH modifying agent preferably comprises a basifying agent and/or a buffering agent. For example, one or more compounds selected from acidifying, basifying and buffering agents can be included to provide a pH of 2 to 10, or in various illustrative embodiments, a pH of 2 to 8, 3 to 9, 4 to 8, 5 to 7, 6 to 10, or 7 to 9. Any orally acceptable pH modifying agent can be used including, without limitation, carboxylic, phosphoric and sulfonic acids, acid salts (e.g., monosodium citrate, disodium citrate, monosodium malate); alkali metal hydroxides such as sodium hydroxide; carbonates such as sodium carbonate, bicarbonates, and sesquicarbonates; borates; silicates; phosphates (e.g., monosodium phosphate, trisodium phosphate, pyrophosphate salts), imidazole and the like. One or more pH modifying agents are preferably present in a total amount effective to maintain the composition in an orally acceptable pH range.

Mouth-feel agents that may be incorporated into the compositions used in the methods defined herein include materials which impart a desirable texture or other feeling during use of the composition. Such agents include bicarbonate salts, which may impart a "clean feel" to teeth and gums due to effervescence and release of carbon dioxide. Any orally acceptable bicarbonate can be used, including, without limitation, alkali metal bicarbonates such as sodium and potassium bicarbonates, ammonium bicarbonate, and mixtures thereof. One or more bicarbonate salts are optionally present in a total amount of from 0.1 weight % to 50 weight %, for example from 1% to 20 weight %, by total weight of the composition.

The compositions provided herein may optionally comprise a sweetener. Sweeteners which may be used in the compositions of the present invention include artificial sweeteners such as saccharin, acesulfam, neotam, cyclamate or sucralose; natural high-intensity sweeteners such as thaumatin, stevioside or glycyrrhizin; or sugar alcohols such as sorbitol, xylitol, maltitol or mannitol. These may be present in an amount of up to 0.5 weight %, optionally from 0.005 weight % to 0.1 weight %, based on the total weight of the composition.

The compositions provided herein may optionally comprise a flavorant. Flavorants that may be used in the compositions of the present invention include essential oils as well as various flavoring aldehydes, esters, alcohols, and similar materials. Examples of the essential oils include oils of spearmint, peppermint, aniseed, wintergreen, sassafras, clove, sage, eucalyptus, marjoram, cinnamon, lemon, lime, grapefruit, and orange. Also useful are such chemicals as menthol, carvone, and anethole. Of these, the most commonly employed are the oils of peppermint and spearmint. The flavourant may be incorporated in the composition in an amount of from 0.1 weight % to 5 weight %, or from 0.5 weight % to 1.5 weight %, by total weight of the composition.

The compositions provided herein may comprise at least one colorant. Colorants herein include pigments, dyes and agents imparting a particular luster or reflectivity such as pearling agents. Any orally acceptable colorant can be used, including without limitation talc, mica, magnesium carbonate, calcium carbonate, magnesium silicate, magnesium aluminum silicate, silica, titanium dioxide, zinc oxide, red, yellow, brown and black iron oxides, ferric ammonium ferrocyanide, manganese violet, ultramarine, titaniated mica, bismuth oxychloride and the like. One or more colorants are optionally present in a total amount of from 0.001 weight % to about 20 weight %, for example, from 0.01 weight % to 10 weight %, or from 0.1 weight % to 5 weight %, by total weight of the composition.

Preservatives, such as chlorhexidine, triclosan, quaternary ammonium compounds (such as benzalkonium chloride) or parabens (such as methyl or propyl paraben) may be incorporated in the compositions used in the methods of the present invention. The amount of preservative is typically up to 0.5 weight %, optionally from 0.05 to 0.1 weight %, by total weight of the composition.

The compositions provided herein may optionally comprise a humectant. Any orally acceptable humectant can be used, including without limitation, polyhydric alcohols such as glycerin, sorbitol, xylitol or low molecular weight PEGs. Most humectants also function as sweeteners. One or more humectants are optionally present in a total amount in the range of from 1 weight % to 70 weight %, for example, from 1 weight % to about 50 weight %, from 2 weight % to 25 weight %, or from 5 weight % to 15 weight %, by total weight of the composition.

Preferably, the compositions defined herein comprise a fluoride ion source. Fluoride ion sources include, but are not limited to: stannous fluoride, sodium fluoride, potassium fluoride, potassium monofluorophosphate, sodium monofluorophosphate, ammonium monofluorophosphate, sodium fluorosilicate, ammonium fluorosilicate, amine fluoride such as olaflur (N'-octadecyltrimethylendiamine-Nionic,N,N'-tris (2-ethanol)-dihydrofluoride), ammonium fluoride, and combinations thereof. Optionally, the fluoride ion source includes stannous fluoride, sodium fluoride, amine fluorides, sodium monofluorophosphate, as well as mixtures thereof. Preferably, the oral care composition of the invention may also contain a source of fluoride ions or fluorine-providing ingredient in amounts sufficient to supply about 50 to about 5000 ppm fluoride ion, e.g., from about 100 to about 1000, from about 200 to about 500, or about 250 ppm fluoride ion.

Fluoride ion sources may be added to the compositions used in the invention in an amount of from 0.001 weight % to 10 weight %, e.g., from 0.003 weight % to 5 weight %, or from 0.01 weight % to 1 weight % or to 0.05 weight %. However, it is to be understood that the weights of fluoride salts to provide the appropriate level of fluoride ion will vary based on the weight of the counter ion in the salt, and one of skill in the art may readily determine such amounts. A preferred fluoride salt may be sodium fluoride.

Uses

As mentioned above, the present inventors have unexpectedly found that basic amino acids such as arginine, at low concentrations, is effective in accelerating HSP 27 production in damaged soft tissues of the oral cavity. HSP 27 is considered to be a "molecular chaperone". When cells become stressed or damaged, proteins denature (unfold) losing their biological activity. Stressed or damaged cells produce HSPs such as HSP 27 which facilitate the folding of denatured proteins into their active conformation. Furthermore, HSP 27, in particular, has been implicated in the inflammatory and apoptotic responses, and thus plays an important role in the repair of tissue damage and wound healing. By accelerating the production of HSP 27 in damaged tissues of an oral cavity, basic amino acids such as arginine are effective in promoting the healing of damaged tissue of an oral cavity, and in promoting wound healing in an oral cavity. Since HSP 27 plays a central role in tissue repair and healing, the use of basic amino acids to target HSP 27 provides a new and advantageous clinical situation over other known agents for tissue repair and wound healing, which may target other pathways or mediators.

Accordingly, in one arrangement, there is provided an oral care composition comprising a basic amino acid or a salt thereof in an amount of from 0.001 weight % to 0.08 weight % by total weight of the composition, and an orally acceptable carrier, for use in preventing or repairing tissue damage in an oral cavity and/or for promoting wound healing in a tissue of an oral cavity. The composition may be as defined herein. Preferably, the use comprises increasing or accelerating HSP 27 expression in the tissue. The tissue damage or wound as described above may arise from poor-fitting braces and dentures, infection from microorganisms, physical trauma from biting or from sharp food, burns and/or allergies.

In another arrangement, there is provided a method of preventing or repairing tissue damage in an oral cavity and/or promoting would healing in a tissue of an oral cavity comprising contacting the oral cavity with an oral care composition comprising a basic amino acid or a salt thereof in an amount of from 0.001 weight % to 0.08 weight % by total weight of the composition, and an orally acceptable carrier. The composition may be as defined herein. Preferably, the prevention or repair of tissue damage and/or wound healing comprises increasing or accelerating HSP 27 expression in the tissue.

Given that the present inventors have found that the compositions provided herein are effective in accelerating or increasing HSP-27 production, and given the known roles of HSP-27 in diminishing inflammation and diminishing reactive oxygen species, there is further provided an oral care composition comprising a basic amino acid or a salt thereof in an amount of from 0.001 weight % to 0.08 weight % by total weight of the composition, and an orally acceptable carrier, for use in preventing or treating inflammation in a tissue of an oral cavity and/or for use in reducing reactive oxygen species in a tissue of an oral cavity. The composition may be as defined herein. Preferably, the use comprises increasing or accelerating HSP 27 expression in the tissue. The reduction in inflammation and/or reactive oxygen species may occur in conjunction with the repair/healing of tissue damage and wounds as described above, and thus may enhance the repair/healing of tissue damage and wounds.

In another arrangement there is further provided a method of preventing or treating inflammation and/or reducing reactive oxygen species in a tissue of an oral cavity comprising contacting the oral cavity with an oral care composition comprising a basic amino acid or a salt thereof in an amount of from 0.001 weight % to 0.08 weight % by total weight of the composition, and an orally acceptable carrier. The composition may be as defined herein. Preferably, the method comprises increasing or accelerating HSP 27 expression in the tissue.

In a further arrangement, there is provided a method of increasing or accelerating HSP 27 in a soft tissue of an oral cavity comprising administering to the tissue a composition as defined herein. Optionally the method further comprises one or more of the following: preventing or repairing soft tissue damage in the oral cavity, healing a wound in the tissue of the oral cavity, preventing or treating inflammation in the tissue of the oral cavity, and reducing reactive oxygen species in the tissue of the oral cavity.

In a still further arrangement, there is provided a use of any of the compositions defined herein for the manufacture of a medicament for one or more of: preventing or repairing soft tissue damage in the oral cavity, healing a wound in the tissue of the oral cavity, preventing or treating inflammation in the tissue of the oral cavity, and reducing reactive oxygen species in the tissue of the oral cavity. Each of these effects is preferably associated with an increased or accelerated expression of HSP 27.

In some embodiments of the arrangements provided herein, the tissue is soft tissue. The term "soft tissue" generally refers to any tissue of the oral cavity other than hard dental surfaces, and encompasses oral mucous membranes, gingival tissue and tongue. In a preferred embodiment, the tissue comprises gingival tissue.

The increased or accelerated expression of HSP 27 as defined herein refers to HSP 27 gene expression and/or protein expression.

To achieve the clinical benefits described herein, the composition may be brought into contact with the wound or tissue of the oral cavity for a period of at least 30 seconds, at least 1 minute, at least 5 minutes, at least 10 minutes, at least 15 minutes or at least 1 hour. The time of contact may be varied according to the form of the composition. Where the basic amino acid or salt thereof is applied as a component of a mouthwash, an illustrative minimum period of rinsing is from 10 seconds to 2 minutes. Where the basic amino acid or salt thereof is applied as a component of a dentifrice, an illustrative minimum period of brushing is from 30 seconds to 5 minutes, or at least 1 minute, or at least 2 minutes. Where the basic amino acid or salt thereof is applied as a component of an oral strip, the strip is placed in the oral cavity illustratively for a period of from 15 minutes to 8 hours (for example, overnight). Where the basic amino acid or salt thereof is applied as a component of a chewing gum, an illustrative minimum period of chewing is from 1 to 20 minutes.

The following Examples illustrate methods of the invention and their uses. The Examples are illustrative and do not limit the scope of the invention.

EXAMPLES

Example 1—Formulation 1—Dentifrice

Table 1 illustrates an exemplary formulation according to the present invention.

TABLE 1

| Ingredients | Weight (%) |
| --- | --- |
| Water | Q.S. |
| Precipitated calcium carbonate | 20-40 |
| Glycerin | 10-20 |
| Alkyl sulfate surfactant | 1-3 |
| Basic Amino Acid | 0.001-0.08 |
| Tetrasodium pyrophosphate | 0.1-1 |
| Sodium CMC | 1-3 |
| Sodium bicarbonate | 1-3 |
| Benzyl alcohol | 0.1-0.5 |
| Sodium saccharin | 0.1-0.5 |
| Flavor | 1-3 |
| Titanium Dioxide | 0.5-2 |

Example 2—Effect of Arginine on HSP 27 Production in Damaged Gingival Tissue

A scratching protocol was used to damage and stress human gingival tissue (MatTek Corporation). Arginine, at a dose of 50 ppm was applied to the culture medium containing the tissue. The treated tissue was incubated at 37° C. to promote tissue healing. Cell supernatant was collected at various time points and the level of HSP 27 was measured. The results are illustrated in Table 2.

TABLE 2

Results of HSP 27 assay (gingival tissue)

| | HSP27 concentration (ng/ml) | | |
| --- | --- | --- | --- |
| Incubation time, hr | Unscratched | Scratched untreated | Arginine 50 ppm |
| 0 | 12.77 | 9.48 | 22.78 |
| 1 | 5.90 | 87.88 | 218.76 |
| 4 | 15.16 | 297.93 | 359.72 |

As can be seen from Table 2, HSP27 was produced by the unscratched tissue at low levels which did not change significantly over time. There was an increased production of HSP 27 by the scratched tissue. Arginine, at the low dose of 50 ppm significantly accelerated, and in fact, enhanced, the production of HSP 27—there was a significantly increased amount of HSP 27 both at 1 hour and at 4 hours, as compared to the untreated, scratched tissue. These data suggest that arginine effectively promotes the repair of tissue damage and wound healing in soft tissues of the oral cavity at low concentrations.

Example 3—Migration of Human Keratinocytes in Response to Scratch Treatment

Human keratinocytes are cultured in DMEM medium supplemented with 10% FBS and 1% of antibiotic at 37° C. under a 5% $CO_2$ atmosphere in petri dishes. Once the cells are 80-90% confluent, a scratch is made horizontally and a scratch is made vertically across the layer of cells. 1 ml of a test solution is added to the culture, and the cells are further incubated and monitored by photomicroscopy to evaluate the closure of the gap created by the scratches. The test solutions compared are 100 ppm Arginine in DMEM medium and untreated DMEM medium. The results are shown in Table 3 below, expressed as the average width of the gap as a percentage of the initial width of the gap (at 0 hours). It is found that under both conditions, the gap is fully closed at 144 hours, but that the gap proceeds to closure significantly faster in the presence of 100 ppm Arginine compared to the DMEM control.

TABLE 3

Gap Closure After Scratch

| Time, hr | % Gap Closure Untreated | % Gap Closure 100 ppm Arginine |
|---|---|---|
| 24 | 17% | 21% |
| 48 | 52% | 63% |
| 144 | 100% | 100% |

A second gap closure experiment is also performed which compares the results obtained when 100 ppm Arginine in DMEM is used against 1:500 v/v dilutions of commercial mouthwash formulations. In one test, a 0.8% w/v arginine mouthwash formulation is used. In a second test, a 0.075% w/v cetylpyridinium chloride (CPC) mouthwash formulation is used as a negative control. CPC is common antibacterial agent and preservative used in oral care products. The results are shown in Table 4 below. It is found that the 1:500 dilution of a 0.08% arginine mouthwash performs comparably to the 100 ppm arginine solution, whereas the 1:500 dilution of the CPC mouthwash results in considerably less gap closure.

TABLE 4

Gap Closure After Scratch

| Time, hr | % Gap Closure 100 ppm Arginine | % Gap Closure 1:500 Arg mouthwash | % Gap Closure 1:500 CPC mouthwash |
|---|---|---|---|
| 48 | 75% | 87% | 38% |

Example 4—Intracellular Expression of HSP 27 in Scratched Keratinocytes

Human keratinocytes are cultured in DMEM medium supplemented with 10% FBS and 1% of antibiotic at 37° C. under a 5% $CO_2$ atmosphere in petri dishes. Once the cells are 80-90% confluent, a scratch is made horizontally and a scratch is made vertically across the layer of cells. 1 ml of a 50 ppm arginine solution is added to the culture, and the cells are further incubated for 1 hour or 4 hours. At 0 hours, 1 hour and 4 hours, cells are collected, washed, and trypsinized and 1 ml of HSP-27 extraction buffer is added. The cell suspension is then homogenized with metal beads for 5 minutes and then analyzed for HSP27 using ELISA. The results are shown in Table 5 below. In both untreated and arginine treated cells, scratching induces a strong increase in intracellular HSP-27 expression at one hour which declines at 4 hours. However, it is apparent that treatment with arginine results in a significantly higher expression of HSP-27. Without being bound by theory, Applicants believe that it is this initial burst of HSP-27 expression at the time of physical injury that contributes to improved wound healing.

TABLE 5

Results of Intracellular HSP27 Expression Assay

| Time, hr | HSP-27 (ng/ml) Untreated | HSP-27 (ng/mL) 50 ppm Arginine |
|---|---|---|
| 0 | 17.78 | 17.11 |
| 1 | 49.36 | 64.04 |
| 2 | 51.99 | 45.12 |

Whilst particular embodiments of the invention have been illustrated and described, it will be obvious to those skilled in the art that various changes and modifications may be made without departing from the scope of the invention as defined in the appended claims.

What is claimed is:

1. A method of increasing or accelerating HSP 27 expression in a tissue of an oral cavity comprising administering to the tissue a dentifrice composition comprising arginine or a salt thereof in an amount of 0.005 weight %, calcium carbonate in an amount of 20 weight % to 40 weight %, sodium lauryl sulfate, tetrasodium pyrophosphate in an amount of 0.1 weight %, and an orally acceptable carrier, wherein the dentifrice composition does not contain lysine, citrulline, ornithine, creatine, histidine, diaminobutanoic acid, or diaminopropionic acid, or a salt of lysine, citrulline, ornithine, creatine, histidine, diaminobutanoic acid, or diaminopropionic acid and wherein the weight % is by total weight of the composition.

2. The method of claim 1, wherein the method comprises preventing or repairing soft tissue damage in the oral cavity, or wherein the method comprises healing a wound in the tissue of the oral cavity, or wherein the method comprises preventing or treating inflammation in the tissue of the oral cavity, or wherein the method comprises reducing reactive oxygen species in the tissue of the oral cavity.

3. The method of claim 1, wherein the tissue is gingival tissue.

4. The method of claim 1 comprising contacting the oral cavity with the dentifrice composition for a period of at least 30 seconds, at least 1 minute, at least 5 minutes, at least 10 minutes, at least 15 minutes or at least 1 hour.

5. A method of increasing or accelerating HSP 27 expression in a tissue of an oral cavity comprising administering to the tissue a dentifrice composition comprising an effective amount of arginine or a salt thereof and tetrasodium pyrophosphate in an amount of 0.1 weight %, wherein the effective amount of the arginine or salt thereof is 50 ppm.

6. The method of claim 5, wherein the method comprises preventing or repairing soft tissue damage in the oral cavity, or comprises healing a wound in the tissue of the oral cavity or comprises preventing or treating inflammation in the tissue of the oral cavity, or comprises reducing reactive oxygen species in the tissue of the oral cavity.

7. The method of claim 5, wherein the tissue is gingival tissue.

8. The method of claim 2, wherein the method comprises reducing reactive oxygen species in a tissue in the oral cavity.

9. The method of claim 1, wherein the method comprises preventing or repairing soft tissue damage in the oral cavity.

10. The method of claim 1, wherein the dentifrice composition further comprises 1 weight % to 3 weight %, by total weight of the composition, of sodium bicarbonate.

11. The method of claim 5, wherein the dentifrice composition further comprises 20 weight % to 40 weight %, by total weight of the composition, of calcium carbonate.

12. The method of claim 5, wherein the dentifrice composition further comprises 1 weight % to 1 weight %, by total weight of the composition, of sodium bicarbonate.

* * * * *